(12) United States Patent
Louca et al.

(10) Patent No.: US 11,025,481 B1
(45) Date of Patent: Jun. 1, 2021

(54) NETWORK ALERT CORRELATION

(71) Applicant: Amazon Technologies, Inc., Seattle, WA (US)

(72) Inventors: Andreas Louca, Seattle, WA (US); Toni Pivcevic, Dublin (IE); George Georgiou, Dublin (IE); Filip Boltuzic, Dublin (IE)

(73) Assignee: Amazon Technologies, Inc., Seattle, WA (US)

( * ) Notice: Subject to any disclaimer, the term of this patent is extended or adjusted under 35 U.S.C. 154(b) by 298 days.

(21) Appl. No.: 15/840,929

(22) Filed: Dec. 13, 2017

(51) Int. Cl.
*H04L 12/24* (2006.01)

(52) U.S. Cl.
CPC .......... *H04L 41/065* (2013.01); *H04L 41/069* (2013.01)

(58) Field of Classification Search
CPC .............................. H04L 41/065; H04L 41/069
See application file for complete search history.

(56) References Cited

U.S. PATENT DOCUMENTS

| | | | |
|---|---|---|---|
| 8,832,498 B1 | 9/2014 | Jain et al. | |
| 9,785,497 B1 | 10/2017 | Cook et al. | |
| 2013/0144932 A1* | 6/2013 | Atkins | ........... H04L 41/0618 709/201 |
| 2015/0019913 A1 | 1/2015 | Singh et al. | |
| 2015/0222477 A1 | 8/2015 | Ranjan et al. | |
| 2015/0280968 A1* | 10/2015 | Gates | ............. G06F 11/0709 714/37 |
| 2016/0179598 A1* | 6/2016 | Lvin | ................ G06F 11/079 714/48 |
| 2016/0218911 A1* | 7/2016 | Wessels | ........... H04L 41/065 |
| 2018/0276063 A1 | 9/2018 | Mendes et al. | |
| 2019/0165988 A1* | 5/2019 | Wang | ............... H04L 41/064 |

\* cited by examiner

*Primary Examiner* — Caroline H Jahnige
(74) *Attorney, Agent, or Firm* — Klarquist Sparkman, LLP

(57) ABSTRACT

Technologies are provided for correlating alert messages using placeholder correlation records. When a network alert message is received, a network component associated with the alert can be identified and a correlation record can be created that is associated with the identified network component. A model of the computer network can be used identify another network component that is related to the identified network component. If a correlation record for the related component does not exist, then a placeholder correlation record for the related component can be created. If another alert message is received that is associated with another component that is also related to the same component, then the placeholder correlation record can be used to correlate the alert messages. An event message can be generated that indicates an occurrence of a network event involving the related component associated with the placeholder correlation record. Placeholder correlation records can be used to associate alert messages with previously generated events.

18 Claims, 9 Drawing Sheets

FIG. 3

```
     ⎧ {
     ⎪       'alert_type': 'interface:down',  ⟵ 319
     ⎪       ⎧'entity': {
     ⎪   318⎨         ...    ⟵ 312
310 ⎨       ⎩},
     ⎪       'domain': {
     ⎪               'name': 'INACTIVE',  ⟵ 314
     ⎪               'reason': 'System maintenance'  ⟵ 316
     ⎪       }
     ⎩ }
```

```
     ⎧ {
     ⎪       'uuid': '7497d52c-b28d-4c39-8ebe-c2bd2c95eec9',
     ⎪       'event_type': 'device:unreachable'  ⟵ 356
     ⎪       'earliest_alert_datetime': '2017-10-10T11:02:25.199290Z',
     ⎪       'creation_datetime': '2017-10-10T11:02:25.199290Z',
     ⎪       'entity': {
350 ⎨               ...  ⟵ 312
     ⎪       },
     ⎪       'correlation_domain': {
     ⎪               'name': 'INACTIVE',
     ⎪               'reason': 'System maintenance'
     ⎪       }
     ⎩ }
```

NETWORK ALERT CORRELATION

BACKGROUND

At least some network devices (such as switches and routers) are designed to generate alerts when certain events occur (such as communication failures). Some monitor programs exist that can detect such alerts and generate notifications, informing engineering and/or administrative staff of the events. In at least some cases, several alerts may share a same root cause. In such cases, a monitor program may generate multiple notifications for a single network event.

BRIEF DESCRIPTION OF THE DRAWINGS

FIG. 3 depicts example messages decorated with correlation domain information.

DETAILED DESCRIPTION

Figure 1:
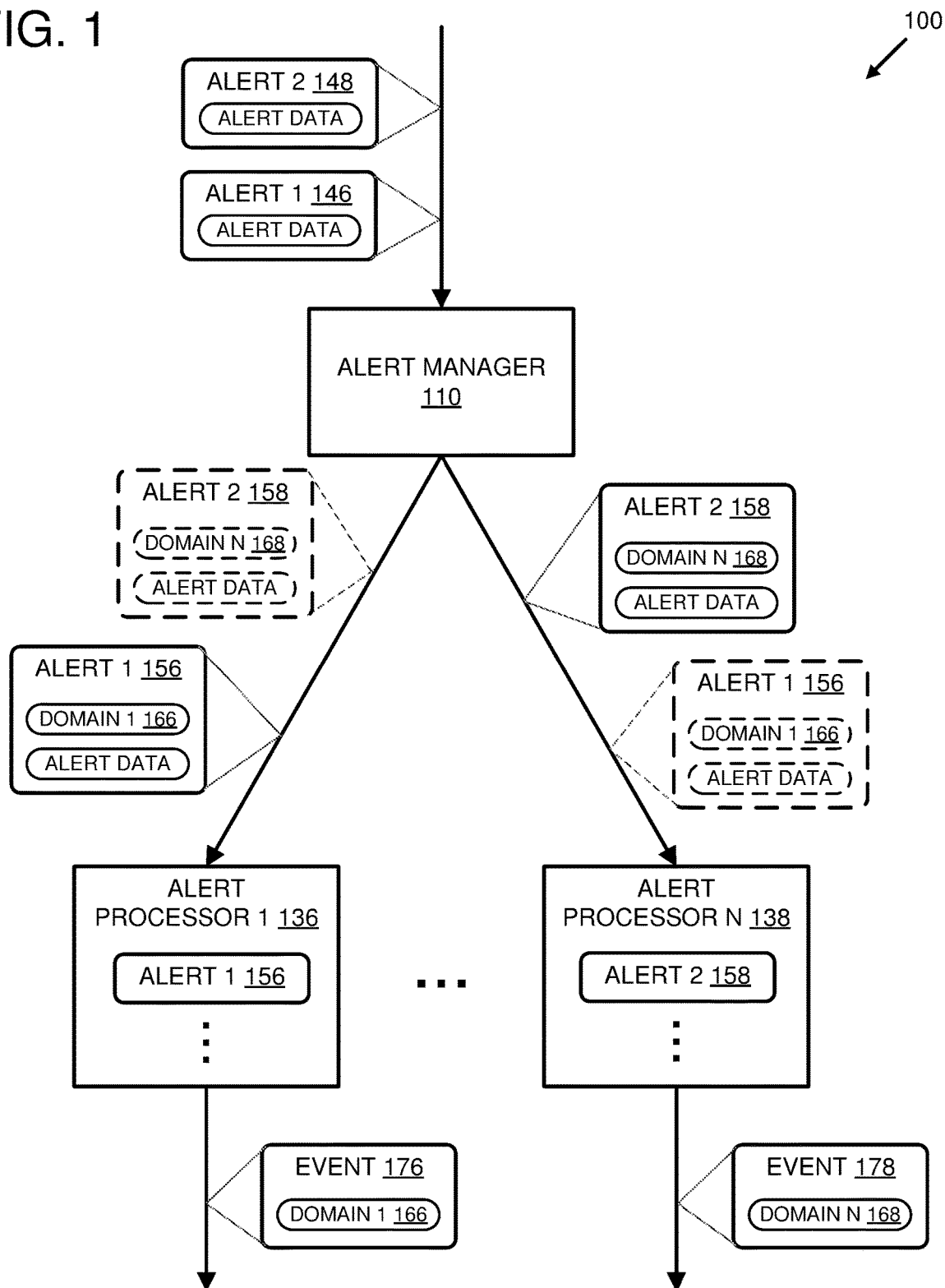
FIG. 1 is a system diagram depicting an example system configured to correlate alert messages using correlation domains.

Technologies are provided for identifying events in a computer network (such as network device failures, communication failures, etc.) using received alert messages. When a network component encounters an error, an alert message describing the error can be generated. The alert message can be received and used to create an event message that is sent to a system operator (such as a network administrator, network engineer, etc.). However, in at least some cases, a single failure in the network can result in the generation of multiple alerts. This can result in multiple redundant events being generated for a single failure.

At least some of the embodiments of the technologies described herein can address this problem by correlating multiple alert messages to identify a root cause of the multiple alerts and to generate a single event for the root cause, rather than generating multiple events for the individual alert messages. In at least some cases, such correlation operations can be scaled by using multiple alert correlation processes that can operate in parallel (i.e., at least two of the multiple correlation processes can operate independently at least some of the time). At least some of the technologies described herein can be used to support parallel operation of alert correlation processes.

For example, separate correlation domains can be defined that can be used to split received alert messages into multiple groups that can be correlated independently. Such correlation domains can represent separate network zones, network regions, data centers, etc. When an alert message is received, its contents can be analyzed to determine a correlation domain for the alert message. The alert message can then be analyzed by an alert processor associated with the correlation domain. In at least some embodiments, received alert messages are routed to separate alert processors based on their correlation domains. Additionally or alternatively, the alert messages, and associated correlation domain identifiers, can be transmitted to separate alert processors that can use the correlation domain identifiers to process some of the alerts and discard others. In a different or further embodiment, events generated by the domain alert processors can include correlation domain information. Using this information, event handlers that receive the events can handle events for different correlation domains differently.

In a different or further embodiment, placeholder correlation records can be used to correlate alert messages to determine that the alert messages are related to a same network event. When an alert message is received, a network component associated with the alert can be identified and a correlation record can be created that is associated with the network component. A model of the network can be used identify another network component that is related to the network component. If a correlation record exists that is associated with the related component, then the correlation records can be correlated. If a correlation record for the related component does not exist, then a placeholder correlation record for the related component can be created. If another alert message is received for the related component (or a third component that is also related to the same component) the placeholder correlation record can be used to correlate the separate alert messages. An event message can be generated based on the correlated alert messages. In at least some embodiments, correlation records can contain cooldown times, after which the correlation records expire (or "mature"). Thus, in such embodiments, alert messages must be received within a given time range of one another in order for them to be correlated.

Although some of the examples described herein refer to network components and network alerts, the technologies described herein can be applied to other types of electronic devices and alerts as well.

FIG. 1 is a system diagram of an example system 100 configured to correlate alert messages using correlation domains. The example system 100 comprises an alert manager 110 and a plurality of alert processors 136-138.

The alert manager 110 can comprise one or more software and/or hardware components of one or more computing devices. The alert manager 110 is configured to receive alert messages (e.g., 146 and 148). The alert manager 110 can be connected to a computer network and can receive the alert messages from one or more computing devices (not shown) connected to the network. The computing devices can comprise servers, routers, switches, etc. In at least some cases, the alert messages can identify network errors encountered by the computing devices (and/or components of the computing devices) in the network. The alert messages can comprise alert data comprising details pertaining to the alerts. For example, an alert message generated in response to a network error can comprise details about the network error.

In at least some embodiments, the alert messages 146 and 148 can comprise computing device identifiers for the computing devices that generated the alert messages. For example, the computing devices connected to the network can be assigned unique identifiers. Such identifiers can be stored in data structure that represents various relationships among the computing devices.

The alert manager 110 can be configured to analyze the received alert messages to identify correlation domains for the alert messages. The correlation domains can be used to separate the alert messages into groups of messages to be correlated independent of one another. For example a first correlation domain can be defined for computing devices in the network that are in an active state and a second correlation domain can be defined for computing devices in the network that are in an inactive state. Contents of an alert message can be analyzed by the alert manager 110 to determine a correlation domain for the alert message. For example, the alert message can comprise an identifier for a computing device (or computing device component) associated with the alert and a correlation domain can be identified that is associated with the computing device.

The alert manager 110 can be configured to associate the alert messages with correlation identifiers for the identified correlation domains. The correlation domains can be associated with unique identifiers. The alert manager 110 can be configured to decorate the received alert messages with the correlation domain identifiers. For example, the alert manager 110 can analyze the alert message 146, determine that the alert is associated with a first correlation domain, and associate the alert message 146 with an identifier 166 for the first correlation domain. The alert manager 110 can be configured to decorate the alert message 146 with the identifier 166 for the first correlation domain. For example, the alert manager 110 can be configured to generate a modified version of the alert message 156 comprising the correlation domain identifier 166.

Similarly, the alert manager 110 can analyze the alert message 148, determine that the alert is associated with a second correlation domain that is different from the first correlation domain, and associate the alert message 148 with an identifier 168 for the second correlation domain. The alert manager 110 can be configured to decorate the alert message 148 with the identifier 168 for the second correlation domain. For example, the alert manager 110 can be configured to generate a modified version of the alert message 158 comprising the correlation domain identifier 168.

The alert manager 110 can be configured transmit the alert messages and associated correlation domain identifiers to the plurality of alert processors 136-138. An alert processor can comprise one or more software and/or hardware components of one or more computing devices. The alert processors 136-138 can be configured to independently correlate groups of alert messages associated with the different correlation domains. In at least some embodiments, the separate alert processors 136-138 can be associated with the separate correlation domains and configured to correlate alert messages for their respective correlation domains. Alternatively, the alert processors 136-138 can be configured to perform correlation operations for alert messages associated with different correlation domains, but to correlate alert messages for the different correlation domains separately. In FIG. 1, the alert processor 136 is depicted as performing correlation operations for alert messages associated with the first correlation domain and the alert processor 138 is depicted as performing correlation operations for alert messages associated with the second correlation domain. In at least some embodiments, the alert processors 136-138 can comprise processes executing on one or more processors of separate computing devices associated with the correlation domains.

An alert processor can be configured to receive alert messages and associated correlation domain identifiers, and to identify alert messages associated with a same correlation domain identifier. In at least some embodiments, the alert manager 110 is configured to route alert messages to the separate alert processors using the correlation domain identifiers. For example, the alert manager can be configured to route the alert message 156 to the alert processor 136 and to rule the alert message 158 to the alert processor 138.

Additionally or alternatively, the alert processors can be configured to retrieve the alert messages from a data store (not shown) and correlate alert messages that are associated with a same correlation domain. The alert manager 110 can be configured to store the alert messages in the data store with the associated correlation domain identifiers. An alert processor can identify alert messages in the data store that are associated with a same correlation domain, and perform correlation operations using the identified alert messages.

Additionally or alternatively, the alert processors can be configured to receive the alert messages and discard alert messages that are not associated with a same correlation domain. In cases where the alert processors are associated with separate correlation domains, the alert processors can be configured to discard received alert messages that are not associated with their respective correlation domains. For example, the alert processor 136 can be configured to receive the alert messages 156 and 158 and discard the alert message 158. Similarly, the alert processor 138 can be configured to receive the alert messages 156 and 158 and discard the alert message 156.

An alert processor can be configured to correlate alert messages associated with a given correlation domain. For example, the alert processor 136 can be configured to correlate the alert message 156 and one or more other alert messages associated with the first correlation domain. The alert processor 138 can be configured to correlate the alert message 158 and one or more other alert messages associated with the second correlation domain. Correlating alert messages can comprise analyzing the alert messages to identify one or more events (such as network events, etc.) responsible for the generation of the alert messages. For example, a given network event (such as a failure of a computing device connected to the network, etc.) may be responsible for the generation of multiple alert messages. The alert messages can be correlated to determine the network event. In at least some cases, the correlation domains can be used to separate alert messages that are unlikely to be related (such as alerts from computing devices in separate network zones, alerts from production and test computing devices, alerts from active and inactive computing devices, etc.). The separated alert messages can then be correlated by separate alert processors.

An alert processor can be configured to generate a network event message based on a correlation of alert messages for a correlation domain. The network event message can comprise a correlation domain identifier for the correlation domain of the correlated alert messages. For example, the alert processor 136 can be configured to generate an event 176 comprising the identifier 166 for the first correlation domain and the alert processor 138 can be configured to generate an event 178 comprising the identifier 168 for the second correlation domain. In at least some embodiments, a network event message can identify a failed component of a computing device in the correlation domain of the alert messages.

The example system 100 can comprise a network event processor (not shown) that can be configured to filter out certain network event messages based on the correlation domain identifiers. For example, the network event processor can be configured to receive the generated network event messages 176 and 178 from the alert processors 136 and 138 and can take different actions based on the correlation domains of the network event messages. For example, the network event processor can determine that the correlation domain identifier 166 is associated with a correlation domain for computing devices in an active state and can generate a notification for the network event that can be received by one or more network administrators. For example, the network even processor can determine that the correlation domain identifier 168 is associated with a correlation domain for computing devices in an inactive state and can discard the network event message 178.

In any of the examples described herein, a network component (a.k.a., network entity) can be an electronic device (or a component of an electronic device) attached to a network and capable of creating, receiving, and/or transmitting information over one or more communications channels. For example, a network component can be any computer or other communications device operable to selectively route traffic between various ports of the communication device. For example, a network component can be a network interface (or port) of a computer or communications device. In at least some embodiments, networking components can be networking switches and/or routers that comprise multiple network interfaces. In such embodiments, the multiple network interfaces can also be network components. Network components can represent various levels of abstraction of a layout of a network. For example, network components can have a hierarchical relationship, in which components at higher levels represent higher levels of abstraction than components at lower levels.

In any of the examples described herein, the term "network interface" refers to a component of a computer or telecommunications device that, when physically connected to another device, facilitates communication with the other device. In at least some embodiments, network interfaces can be referred to as "ports." Communication across a network interface can be one-way or bi-directional. Bi-directional communication across a network interface can be half-duplex or full-duplex. A device can have multiple network interfaces capable of one-way, half-duplex, and/or full-duplex communication.

Network interfaces of devices can be connected to each other using various types of physical connections, such as fiber optic cables and copper wire cables. Fiber optic cables have higher capacities than copper cables, but can be more expensive and can be more susceptible to signal degradation over long distances. Copper cables are less expensive, but have lower capacities than many optical cables. Various combinations of multiple cable types are also possible. For instance, copper cables may be used to connect rack switches to servers within the server racks, while fiber optic cables may be used to connect the rack switches to other network routers or switches.

Figure 2:
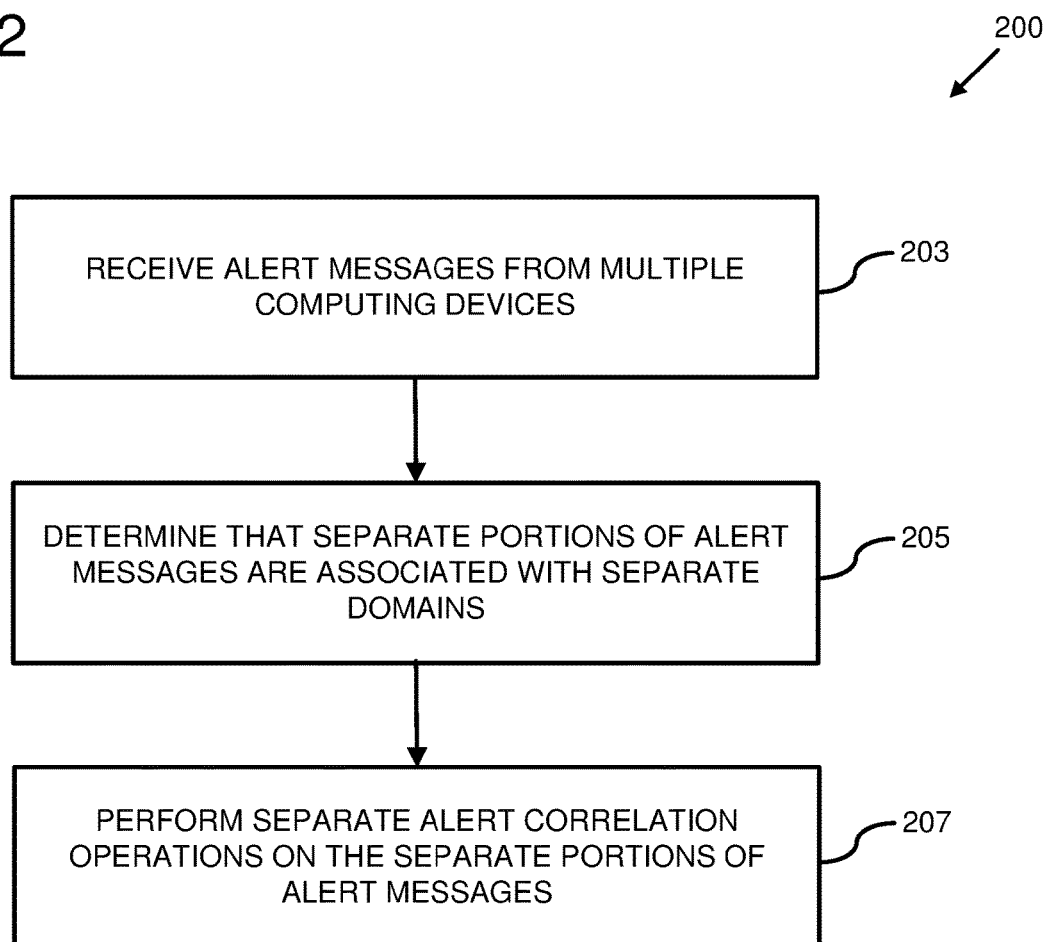
FIG. 2 is a flowchart of an example method for performing separate alert correlation operations using correlation domains.

FIG. 2 is a flowchart of an example method 200 for performing separate alert correlation operations using correlation domains. Any of the example systems described herein can be used to perform the example method 200.

At 203, alert messages are received from multiple computing devices. The alert messages can be received from the multiple computing devices via a computer network. For example, the alert messages can be generated by the multiple computing devices in response to errors (such as network communication errors, etc.) encountered by the multiple computing devices. In at least one embodiment, the multiple computing devices comprise network communication devices (such as routers, switches, etc.) connected to one another in the network.

At 205, it is determined that separate portions of the alert messages are associated with separate correlation domains. A portion of the alert messages can comprise one or more alert messages. Determining that separate portions of the alert messages are associated with separate correlation domains can comprise analyzing contents of the alert messages to identify correlation domains to which the alert messages belong. For example, determining that two portions of the alert messages are associated with two separate correlation domains can comprise determining that a first portion of the alert messages are received from computing devices that are active (e.g., computing devices that are actively processing production data), and determining that a second portion of the alert messages are received from computing devices that are inactive (e.g., computing devices that are in a maintenance mode, computing devices in a new network region that is currently being provisioned, etc.). For example, the alert messages can identifiers for associated computing devices and/or associated computing device components (such as computing device network interfaces, etc.). Such an identifier can be used to determine a correlation domain for a given alert message. In at least some embodiments, a given alert message can only be associated with a single correlation domain.

In at least some embodiments, the alert messages can be decorated with correlation domain identifiers for correlation domains with which the alert messages are associated. For example a first portion of the alert messages can be decorated with a correlation domain identifier for a first correlation domain while a second portion of the alert messages are decorated with a correlation domain identifier for a second correlation domain. In such an embodiment, determining that the two portions of the alert messages are associated with separate correlation domains can comprise determining that the two portions of the alert messages are associated with separate correlation domain identifiers.

At 207, separate alert correlation operations are performed on the separate portions of alert messages. In at least some embodiments, separate processes (and/or separate threads, etc.) can be used to perform separate alert correlation operations on the separate portions of the alert messages. In an embodiment where the alert messages are decorated with correlation domain identifiers, performing the separate alert correlation operations can comprise receiving the decorated alert messages at separate alert processors for the separate correlation domains. For example a given alert processor for one of the correlation domains can be configured to receive the decorated alert messages, to correlate a portion of the decorated alert messages that are decorated with a correlation domain identifier for the correlation domain of the alert processor, and to discard another portion of the decorated alert messages (such as all remaining alert messages) that are decorated with one or more other correlation domain identifiers. Alternatively, performing the separate alert correlation operations on separate portions of the alert messages can comprise routing the separate portions of the alert messages to separate alert correlation processes using the correlation domain identifiers. In at least one embodiment, routing two portions of the alert messages to separate alert correlation processes can comprise transmitting the two portions of the alert messages to the separate alert correlation processes via a computer network. For example, the separate alert correlation processes can be executed on one or more computing devices connected to the computer network.

Performing separate alert correlation operations on a portion of the alert messages can comprise generating an event message based on the portion of the alert messages that is associated with one of the separate correlation domains. The event message can comprise a correlation domain identifier for the correlation domain. In at least some embodiments, a network event processor can be configured to receive the generated event message and determine one or more actions to be taken using the event message based on the event message's correlation domain identifier. For example, the network event processor can be configured to determine whether or not the discard the event message based on the correlation domain identifier. Correlation domains can be used to identify alert to an events associated with different regions of the computer network, different deployment planes (such as a production plane, a testing plane, a staging plane, etc.), different computing device states (such as an active state, an inactive state, etc.), or the like. Events associated with different correlation domains can be handled differently. For example, a network event associated with a production plane may be routed to one group of administrators, while a network event associated with the testing plane may be routed to a different group of administrators. In at least some cases, network events associated with one or more correlation domains may be ignored (such as network events associated with an inactive correlation domain).

FIG. 3 depicts an example alert message 310 and an example event message 350. The alert message 310 comprises correlation domain information 312. The example messages 310 and 350 are presented in a JavaScript Object Notation (JSON) format, but other data formats (such as eXtensible Markup Language (XML) formats, or the like) can also be used.

The correlation domain information 312 can comprise a correlation domain identifier 314. The correlation domain identifier 314 can be an alpha the numerical value that can be used to uniquely identify the associated correlation domain. The correlation domain identifier 312 can, in at least some embodiments, contain correlation domain reason field 316 that contains a human-readable description for why the alert message 310 is included in the given correlation domain.

In at least some embodiments, an alert correlation server can be configured to inspect data of the alert message 310 (such as entity data 318 for a network entity associated with the alert message 310 and/or an alert type 319) and to associate the alert message 310 with a given correlation domain based on the inspected data. In such an embodiment, the alert correlation server can be configured to decorate the alert message 310 with the domain information 312 associated with the given correlation domain.

The network event message 350 can be created based on an alert correlation performed by a domain alert processor, as described herein. The network event message 350 can comprise an event type 356 that indicates a network event correlated with alert messages associated with a given correlation domain (such as the alert message 310). The network event message 350 can include the correlation domain information 312. The correlation domain information 312 can be used by downstream event processors to determine what actions to take in response to receipt of the network event message 350.

In at least one embodiment, an alert correlation server connected to a computer network can be configured to receive a plurality of alert messages (such as the alert message 310) via the computer network. Based on data contained in the received plurality of alert messages (such as the alert type 319 and/or the network entity information 318), the alert correlation server can determine that a first subset of the plurality of alert messages are associated with a first correlation domain and that a second subset of the plurality of alert messages are associated with a second correlation domain. In at least some embodiments, the association with the first correlation domain can indicate that the first subset of alert messages originated from one or more computing devices in an active region of the computer network, and the association with the second correlation domain can indicate that the second subset of alert messages originated from one or more computing devices in an inactive region of the computer network. Associating an alert message with a correlation domain can comprise decorating the alert message with domain information for the correlation domain.

The alert correlation server can use a first domain alert correlation process to correlate the first subset of alert messages that are associated with the first correlation domain and to generate an event message (such as the event message 350) based on the correlation. A second domain alert correlation process can be configured to correlate the second subset of alert messages that are associated with the second correlation domain. A second event message can, in at least some cases, be generated based on the correlation of the second subset of alert messages.

In at least some embodiments, different operations can be performed based on the different domains of the generated event messages. For example, an event handler can be configured to receive the first event message associated with the first correlation domain and to receive the second event message associated with the second correlation domain. The event handler can be configured to generate a network event notifications for the first message based on the correlation domain information (e.g., 312) contained in the first network event message, and to discard the second event message based on the different correlation domain information contained in the second network event message.

Figure 4:
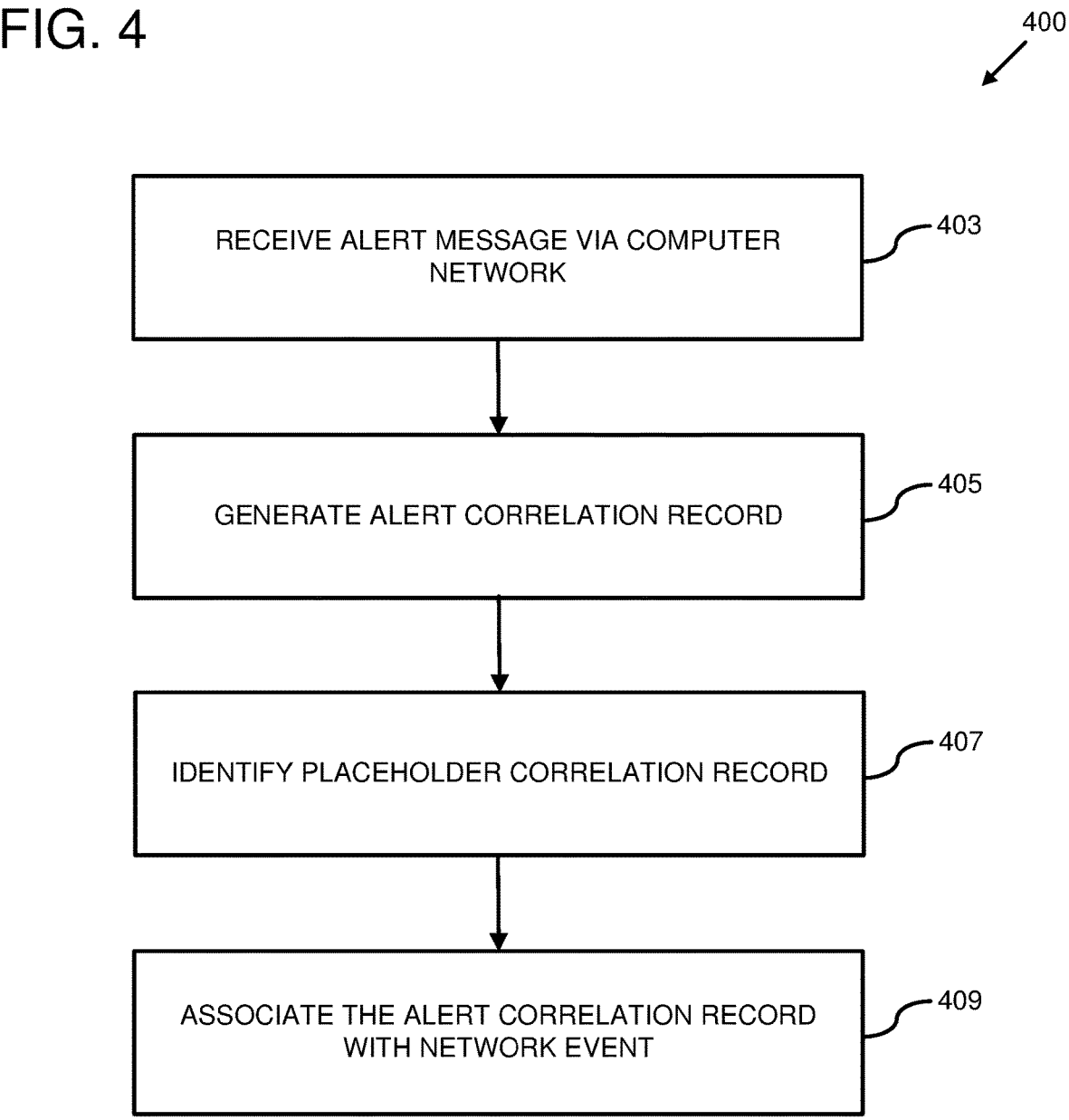
FIG. 4 is flowchart of an example method for correlating alert messages using placeholder correlation records.

FIG. 4 is a flowchart of an example method 400 for correlating alert messages using placeholder correlation records. At least some of the example systems described herein can be used to perform the example method 400.

At 403, an alert message is received via a computer network. In at least some embodiments, the alert message can be received by an alert manager and/or alert correlation server as described herein. The alert message can be generated by a computing device connected to the computer network. For example, computing devices connected to the computer network can be configured to generate alert messages based on one or more network events that are encountered by the computing devices (such as network communication failures, etc.).

At 405, an alert correlation record is generated based on the contents of the alert message. The alert message can contain details pertaining to a network entity (such as a computing device and/or computing device component) with which the alert message is associated. For example, if the alert message is generated based on a failure encountered by a network communication interface of a computing device, the alert message can comprise information identifying the computing device, identifying the network interface, and/or describing the failure that was encountered. The alert correlation record can be generated using the alert message data. The alert correlation record can comprise an identifier for the network entity. In at least some embodiments, the alert message can be stored in association with the alert correlation entity. The alert correlation message can be stored in a correlation record data store (such as one or more tables in a database, etc.).

At 407, a placeholder correlation record is identified for a correlation related to the alert correlation record. A network entity can be determined that is associated with the alert correlation record. For example, the alert correlation record can comprise an identifier for a network entity associated with one or more alert messages associated with the alert correlation record. Another network entity can be identified that is related to the network entity associated with the alert correlation record. A placeholder correlation record can be identified that is associated with the other network entity.

In at least some embodiments, a model (e.g., a topology) of the computer network can be provided that represents network entities in the network and relationships between the network entities. In at least some embodiments, the model of the computer network can comprise a hierarchical representation (such as a tree data structure) of the network entities in the computer network. In such an embodiment, identifying a related network entity for the network entity associated with the alert correlation record can comprise determining that the related network entity is in a hierarchical relationship with the network entity associated with the alert correlation record in the hierarchical representation of the computer network. For example, the network entity associated with the alert correlation record can be a network interface and the identified related network entity can be a computing device comprising the network interface. For example, the hierarchical representation of the computer network can represent the computing device as being at a higher hierarchical level than the network interfaces that it comprises.

Additionally or alternatively, the model of the computer network can comprise a graphical representation (such as a graph data structure) of network entities in the computer network. In such an embodiment, identifying a related network entity can comprise identifying an edge in the graphical representation that is connected to a node in the graphical representation that represents the network entity associated with the alert correlation record. For example, the network entity associated with the alert correlation record can be a network interface and the related network entity can be a communication link (represented by the edge in the graphical representation of the network) that is connected to the network interface and another network interface.

A placeholder correlation record can be a correlation record that is created as a "hook" (or "placeholder") for use in creating correlations between various alert messages. Upon receipt of an alert message via the computer network, and alert correlation record can be created and one or more placeholder correlation records can be created in association with the alert correlation record. For example, a model of the computer network can be used to identify network entities that are related to the network entity associated with the alert correlation record. If a placeholder correlation record does not already exist for a given related network entity, a placeholder correlation record can be created for the related network entity. Subsequently, when another alert message is received that is associated with another network entity that is also related to the network entity associated with the placeholder correlation record, the placeholder correlation record will be located and can be used to establish a correlation between the alert messages.

In at least some embodiments, the placeholder correlation record can specify a "cooldown" time range that can indicate a time range in which the placeholder correlation record can be used to correlate alerts associated with separate correlation records. For example, determining that the placeholder correlation record is related to a given alert correlation record can comprise determining that a current time value is within the specified cooldown time range of the placeholder correlation record. In at least one embodiment, the cooldown time range can indicate a number of time units (such as seconds, milliseconds, etc.) for which the placeholder correlation record is valid after its creation.

A network event can be generated that is associated with the placeholder correlation record. Generating the network event can comprise associating the previously received alert message and the placeholder correlation record with the network event.

At 409, the alert correlation record is associated with the network event associated with the placeholder correlation record. The association between the alert correlation record and the network event can indicate that the alert message and the previously received alert message are related to a same network event. For example, alert correlation records associated with the alert messages can indicate that the various alert messages were received for alerts related to network interfaces of a same given computing device connected to the network. The placeholder correlation record can be associated with the computing device and, using the alert messages associated with the alert correlation records, it can be determined that a network event associated with the computing device affecting both of the identified interfaces has occurred. In an embodiment where the alert correlation record is associated with a network interface and the placeholder correlation record is associated with a computing device comprising the network interface, the network event can indicate that the computing device is unreachable. In an embodiment where the network entity associated with the alert correlation record is a computing device, and the network entity associated with the placeholder correlation record is a data center comprising the computing device, the network event can indicate that multiple computing devices in the data center are unreachable. In an embodiment where the network entity associated with the alert correlation record is a network interface and the network entity associated with the placeholder correlation record is a communication link connected to the network interface, the network event can indicate that the communication link has encountered an error.

In at least some embodiments, the generated network event can indicate that the network event is associated with the received alert message. Additionally or alternatively, the generated network event can indicate that the network event is associated with one or more other alert messages. For example, another alert correlation record can be identified that is associated with the placeholder correlation record (such as an alert correlation record for which the placeholder correlation record was created). The generated network event can indicate that the network event is associated with one or more other alert messages that are associated with the other alert correlation record.

Figure 5:
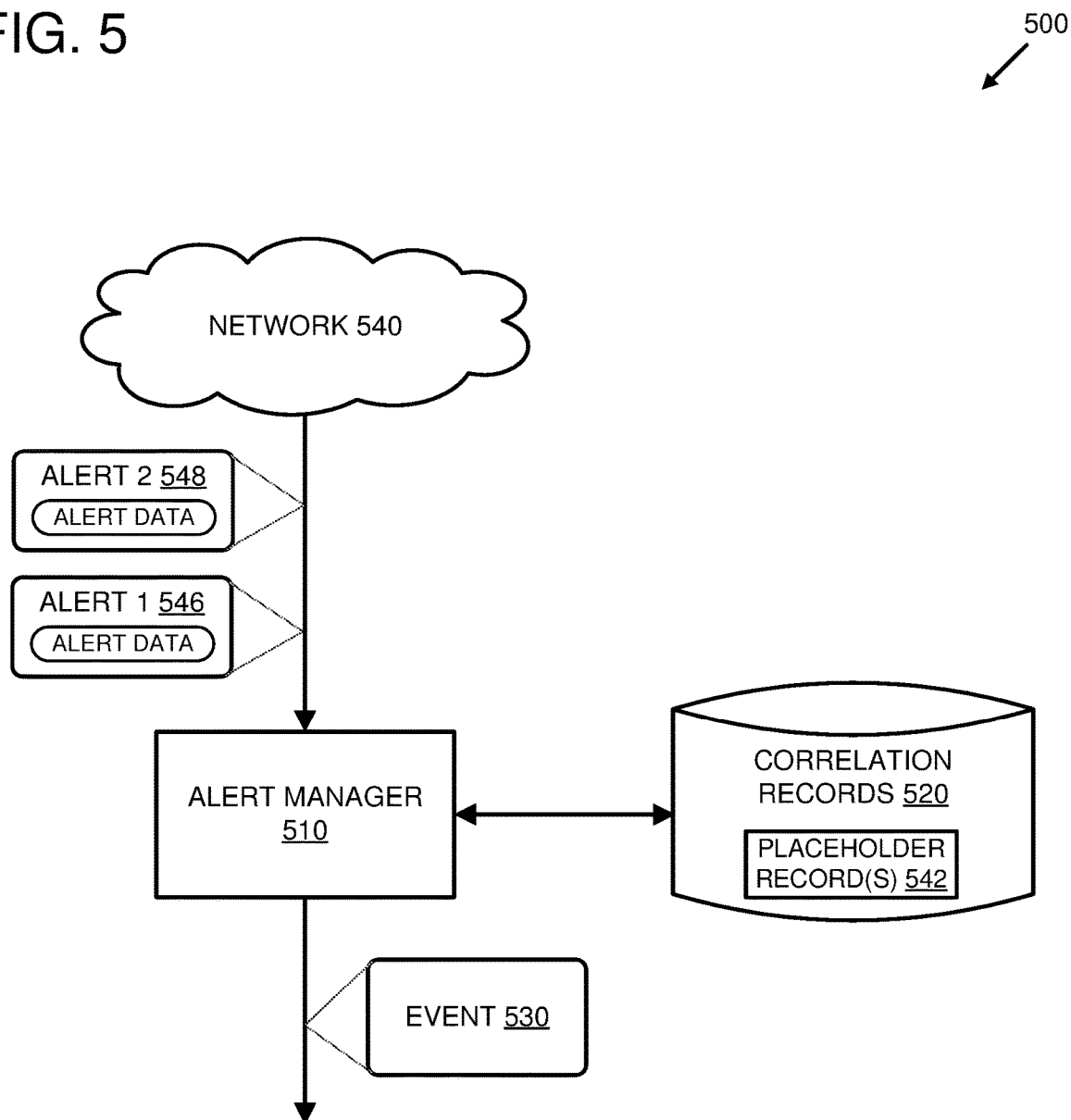
FIG. 5 is a system diagram of an example system configured to correlate network alerts using placeholder correlation records.

FIG. 5 is a system diagram of an example system 500 configured to correlate network alerts (e.g., 546 and 548) using one or more placeholder correlation records 542.

The example system 500 comprises an alert manager 510 connected to a computer network 540. The alert manager 510 can comprise one or more software and/or hardware components of the computing device (such as a server, etc.). The alert manager 510 can be configured to receive a first network message 546 associated with a first network component. A network component can be a computing device (such as a server, switch, router, etc.) connected to the network 540, a sub-component of the computing device connected to the network 540 (such as a network interface of the computing device, etc.), and/or a network region (such as a data center, network zone, availability zones, or the like) comprising one or more computing devices connected to the network 540. Additionally or alternatively, network components can be communication links connecting interfaces of different computing devices in the network 540. In at least some embodiments, a network component associated with a network alert message can be a network component that generated the network alert message and/or a network component to which the alert message pertains.

The alert manager 510 can be configured to create a first alert correlation record associated with the first network alert message. The alert manager 510 can store the alert correlation record in a correlation record data store 520. The correlation record data store can comprise one or more tables in a relational database, one or more object collections in an object-oriented database, one or more document collections a document store, etc.

The alert manager 510 can identify a second network component that is related to the first network component in a model of the computer network. For example the model of the computer network can comprise a tree data structure in which the first network component and the second network component are associated by a parent-child relationship. For example, in an embodiment where the first network component is a network interface of the computing device, the second network component can be the computing device and can be associated with the tree node that has a parent relationship with a child tree node associated with the network interface. Additionally or alternatively, the model of the computer network can comprise a graph data structure in which the second network component is identified as an edge connecting a graph node associated with the first network component. For example, in an embodiment where the first network component is a network interface of the computing device, the second network component can be a communication link connected to the network interface that is represented by an edge in the graph data structure connected to a graph node representing the network interface.

The alert manager 510 can create one or more placeholder correlation records 542 associated with network components that are related to the first network component. For example, a placeholder record can be created that is associated with the second network component. For example, a placeholder correlation record can contain an identifier for the second network component. The one or more placeholder correlation records 542 can be stored in the correlation record data store 520. In at least some embodiments, the one or more placeholder correlation records 542 can be associated with the first alert correlation record. For example, a placeholder correlation record can contain a reference to the first alert correlation record. Such a reference can comprise an identifier of the first alert correlation record (such as a primary key identifier for the first correlation record, or the like).

The alert manager 510 can be configured to receive a second alert message 548 that is associated with a third network component. The alert manager 510 can create a second alert correlation record that is associated with the second network alert message 548. The alert manager 510 can identify one or more network components related to the third network component and can search the correlation records data store 524 placeholder correlation records associated with the one or more identified related network components. For example, the alert manager 510 can determine that the third network component is also related to the second network component and can thus determine that the second alert correlation record is related to the placeholder correlation record associated with the second network component.

The alert manager 510 can generate a network event message 530 using the placeholder correlation record for the second network component, the first alert correlation record, and the second alert correlation record. The network event message 530 can indicate that the second network component (which through use of the first and second alert correlation records can be determined to be related to both the first and third computer network components) has encountered an error. For example, the second network component can be a computing device connected to the network 540 and the first and third network components can be separate network interfaces of the computing device. If alert messages associated with the separate correlation records indicate that the separate network interfaces are unreachable, then the network event can indicate that the computing device is unreachable via the computer network 540, since alerts have been received that indicate that at least two separate interfaces of the computing device are unreachable. For example, the first network component and the third network component can be network interfaces of separate computing devices in the network 540 and the second network component can be a communication link connecting the network interfaces. If alert messages associated with the separate correlation records indicate that the separate network interfaces are unreachable, then the network event can indicate that the communication link connecting the network interfaces has failed.

In at least some embodiments, the first alert correlation record in the placeholder correlation record can be created by a first process (and/or thread) and the second correlation record in the network event message can be created by one or more other processes (and/or threats). For example, the alert manager 510 can be configured to perform a fan-out operation to process the received alert messages in parallel using one or more separate process orders, processes, threats, etc.

Figure 6:
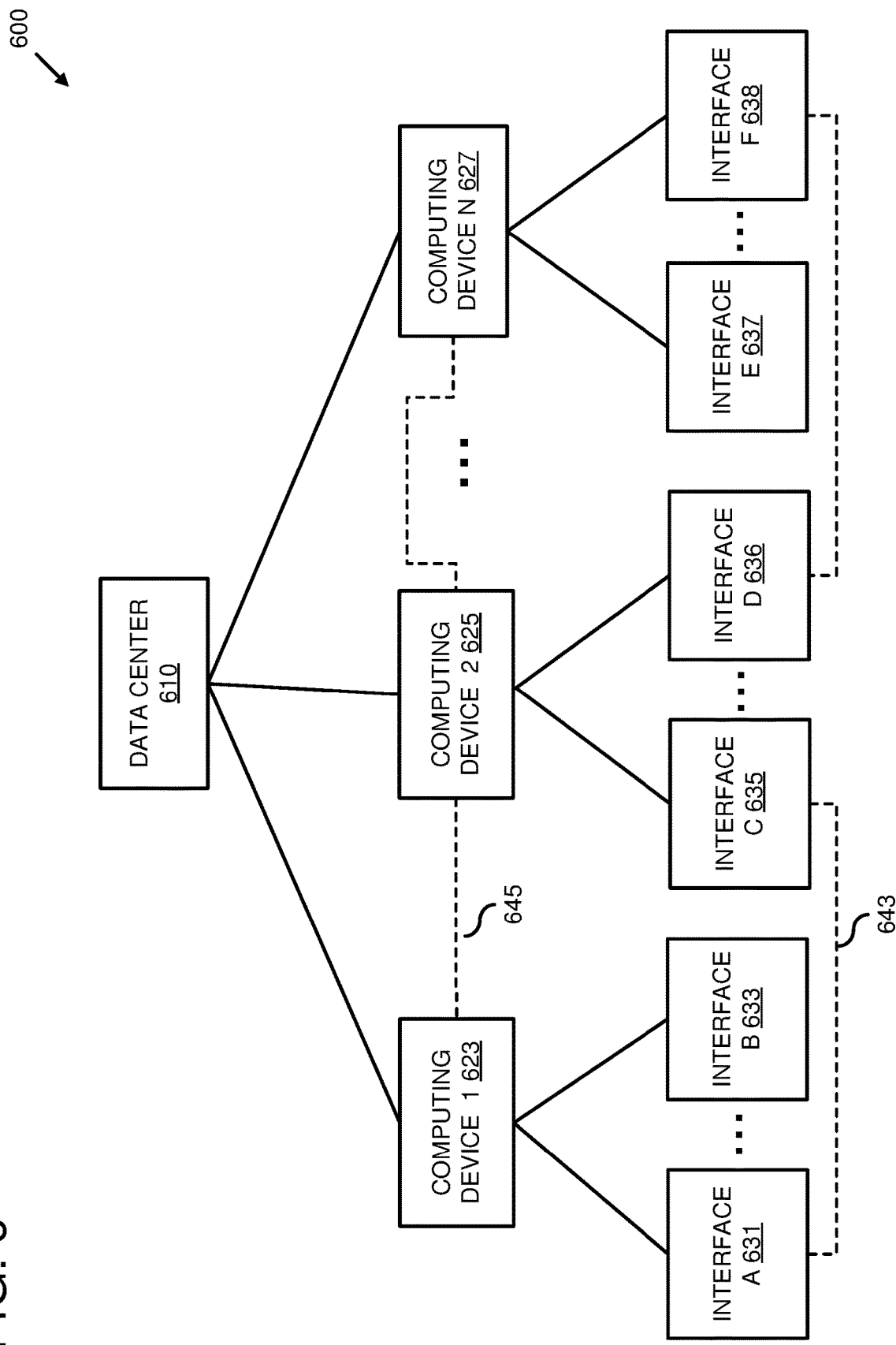
FIG. 6 depicts an example network model comprising a hierarchical representation of a computer network.

FIG. 6 depicts an example network model 600 comprising a hierarchical representation of network entities in a computer network. The example network model 600 can be used with any of the examples discussed herein. The example network model 600 comprises multiple nodes (610, 623-627, and 631-638) associated with network components in a hierarchical representation of the network. The data center node 610 is connected to the computing device nodes 623-627 by parent-child relationships that indicate that the computing devices 623-627 are located in the data center 610. The computing device nodes 623-6 or twenty-seven are connected the various network interface nodes 631-638 by parent-child relationships that indicate that the various network interfaces belong to the computing devices. For example, the network interfaces 631-633 are part of the computing device 623, the network interfaces 635-636 are part of the computing device 625, the network interfaces 637-638 are part of the computing device 627, etc.

In at least some embodiments, the network model 600 can comprise relationships between sibling nodes (i.e., nodes on a same level of the hierarchical representation). Such relationships can indicate that the nodes are connected by a common communication link in the network. For example, the relationship 643 can indicate that the interface 631 of the computing device 623 is connected to the interface 635 of the computing device 625. In at least some cases, multiple interfaces of one computing device can be connected to multiple interfaces of another computing device. Relationships can be defined between computing device sibling nodes that indicate that one or more of the interfaces of one computing device are connected to one or more interfaces of the other computing device. For example, the relationship 645 can indicate that one or more network interfaces of the computing device 623 are connected to one or more network interfaces of the computing device 625.

The example network model 600 can be used to identify network components that are related to one another. For example, when an alert message is received that is associated with a network component, a node for the network component can be located in the model 600 and related network components can be identified using relationships defined in the model 600 for the node for the network component. Related network components can then be used to create and/or locate placeholder correlation records. Such placeholder correlation records can be used to correlate alert messages related to separate network components and to generate network events based on the correlations. With FIG. 7 is a system diagram depicting an example system 700 configured to correlate alert messages 723-729 related to network components of the network model 600 and to generate example event messages 733 and 735 using placeholder correlation records.

Figure 7:
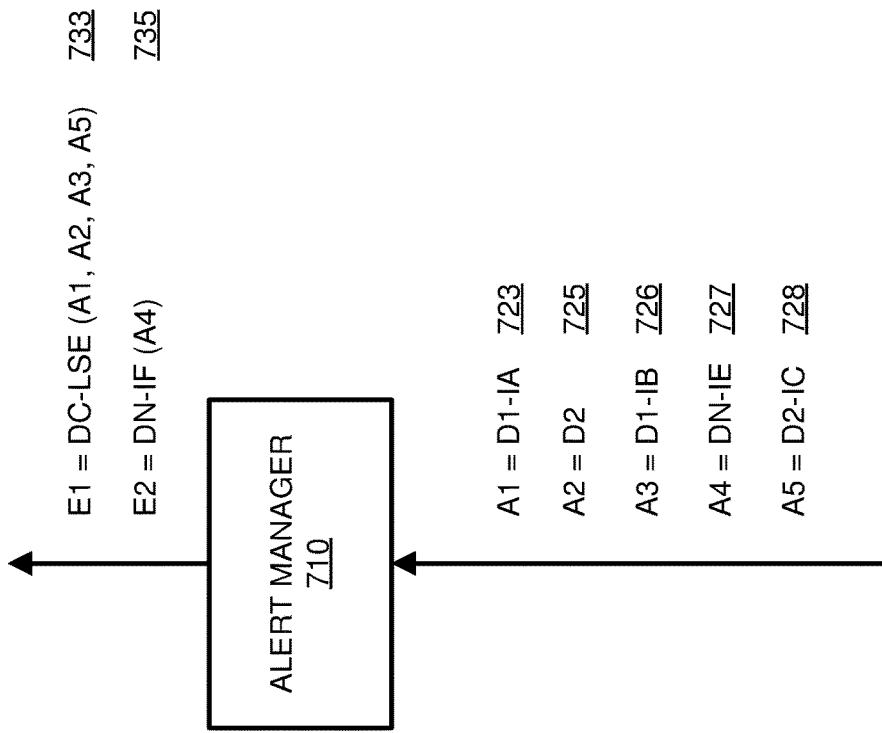
FIG. 7 is a system diagram depicting an example system configured to correlate alert messages and generate example event messages using placeholder correlation records.

In the example scenario depicted in FIG. 7, an alert manager 710 receives five alert messages 723-728 from network components represented by various nodes of the network model 600. The alert messages 723-728 can be received at separate points in time. In at least some embodiments, the alert manager 710 is configured to use multiple processes (and/or threads) to perform alert correlation operations for the alert messages, such that at least some of the alert messages are processed separately.

The alert manager 710 is configured to receive the first alert message 723. The alert manager 710 determines that the alert message 723 is associated with the network interface 631 of the computing device 623 and creates an alert correlation record associated with the network interface 631. The alert manager 710 analyzes the network model 600 and determines that the network interface 631 is related to the computing device 623. The alert manager and 710 determines that a placeholder correlation record does not exist that is associated with the computing device 623 and creates a placeholder correlation record associated with the computing device 623.

The alert manager 710 is configured to receive the second alert message 725. The alert manager 710 determines that the alert message 725 is associated with the computing device 625 and creates an alert correlation record associated with the computing device 625. The alert manager 710 analyzes the network model 600 and determines that the computing device 625 is related to the data center node 610 and the network interface nodes 635-636. The alert manager 710 determines that placeholder correlation records do not exist for these network components and creates placeholder correlation records for the data center node 610 and the network interface nodes 635-636.

The alert manager 710 is configured to receive the third alert message 726. The alert manager 710 determines that the alert message 726 is associated with the network interface 633 of the computing device 623 and creates an alert correlation record associated with the network interface 633. The alert manager 710 analyzes the network model 600 and determines that the computing device 623 is related to the network interface 633. The alert manager 710 identifies the previously created placeholder correlation record associated with the computing device 623 and creates a correlation between the alert correlation record associated with the network interface 631, the alert correlation record associated with the network interface 633, and the computing device 623.

In at least some embodiments, creating the correlation can comprise transforming the placeholder correlation record associated with the computing device 623 into an alert correlation record associated with the alert correlation records for the network interfaces 631 and 633. The alert manager 710 can be configured to analyze the network model 600 and to identify the data center node 610 as being related to the node for the computing device 623. The alert manager 710 can identify the previously created placeholder correlation record associated with the data center node 610 and can extend the previously created correlation between the computing device 623 the network interface 631 and the network interface 633 to also include the data center node 610 and the associated alert correlation record for the computing device 625.

The alert manager 710 is configured to receive the fourth alert message 727. The alert manager 710 determines that the alert message 727 is associated with the network interface 637 of the computing device 627 and creates an alert correlation record associated with the network interface 637. The alert manager 710 analyzes the network model 600 and determines that the network interface 637 is related to the computing device 627. The alert manager 710 determines that a correlation record associated with the computing device 627 does not exist and creates a placeholder correlation record associated with the computing device 627.

The alert manager 710 is configured to receive the fifth alert message 728. The alert manager 710 determines that the alert message 728 is associated with the network interface 635 of the computing device 625 and creates an alert correlation record associated with the network interface 635. The alert manager 710 analyzes the network model 600 and determines that the network interface 635 is related to the computing device 625. The alert manager 710 identifies the previously created alert correlation record associated with the computing device 625 and extends the correlation that includes the computing device 625, the computing device 623, the network interfaces 631 and 633, and the data center node 610 to also include the alert correlation record associated with the network interface 635.

Subsequent to receipt of the fifth alert message 728, the alert manager 710 generate one or more events based on the correlation records that are currently pending. In at least some embodiments, placeholder correlation records are associated with cooldown times that indicate times for which the placeholder correlation records can remain pending. A pending placeholder correlation record is available for use in associations with correlation records for received alert messages. Once the cooldown time for a given placeholder correlation record expires, it is no longer available for use in correlations with subsequently received alert messages.

The alert manager 710 analyzes the correlation that includes the correlation records for the data center node 610, the computing devices 623 and 625, and the network interfaces 631, 633 and, 635 and generates an event 733 based on the analysis. In the example scenario depicted in FIG. 7, the event 733 indicates that a large-scale event (or LSE) has occurred in the data center associated with the data center node 610. An LSE can be a network event comprising failures of multiple computing devices in a given data center. The event 733 can include the alerts 723-726, and 728 that are associated with the alert correlation records included in the correlation.

In at least some embodiments, the event 733 can be generated prior to receipt of one or more of the correlated alerts. When two alerts are correlated, one or more placeholder correlation records can be created for network components that are related to network components associated with the correlated alerts. In some cases, these created placeholder correlation records can remain pending after an event is generated for the correlated alerts. If a subsequently received alert is correlated with one of the pending placeholder correlation records, it can be associated with the generated event, instead of being used to generate a new event. In at least some cases, this can reduce the number of generated events, since related alerts can continue to be associated with previously generated events, even after they have been created.

Since the alert correlation record associated with the network interface 637 is not correlated to any other correlation records, it undergoes an independent event analysis. The alert manager 710 analyzes the alert correlation record (and/or the associated alert message 727) and generates an event 735 that indicates that the interface 637 of the computing device 627 has failed. The event 635 can include the alert message 727 associated with the alert correlation record.

In an alternative embodiment, when the placeholder correlation record for the data center node 610 is transformed into a correlation record associated with the correlation records for the computing devices 623 and 625, the alert manager 710 can traverse down the hierarchical representation of the network model 600 can create a placeholder correlation record for the related computing device 627. In such an embodiment, when the alert 727 is received and a correlation record is created for the network interface 637, the previously created placeholder correlation record for the related computing device 627 can be identified and used to extend the correlation including the data center node 610 to also include the computing device 627 and alert correlation record for the network interface 637. Thus in this embodiment, a single event would be created for a correlation that included all of the received alert messages 723-728. Although such an embodiment can further reduce the number of generated events, in at least some cases it can result in overly aggressive correlation that in accurately correlates independent network errors.

Figure 8:
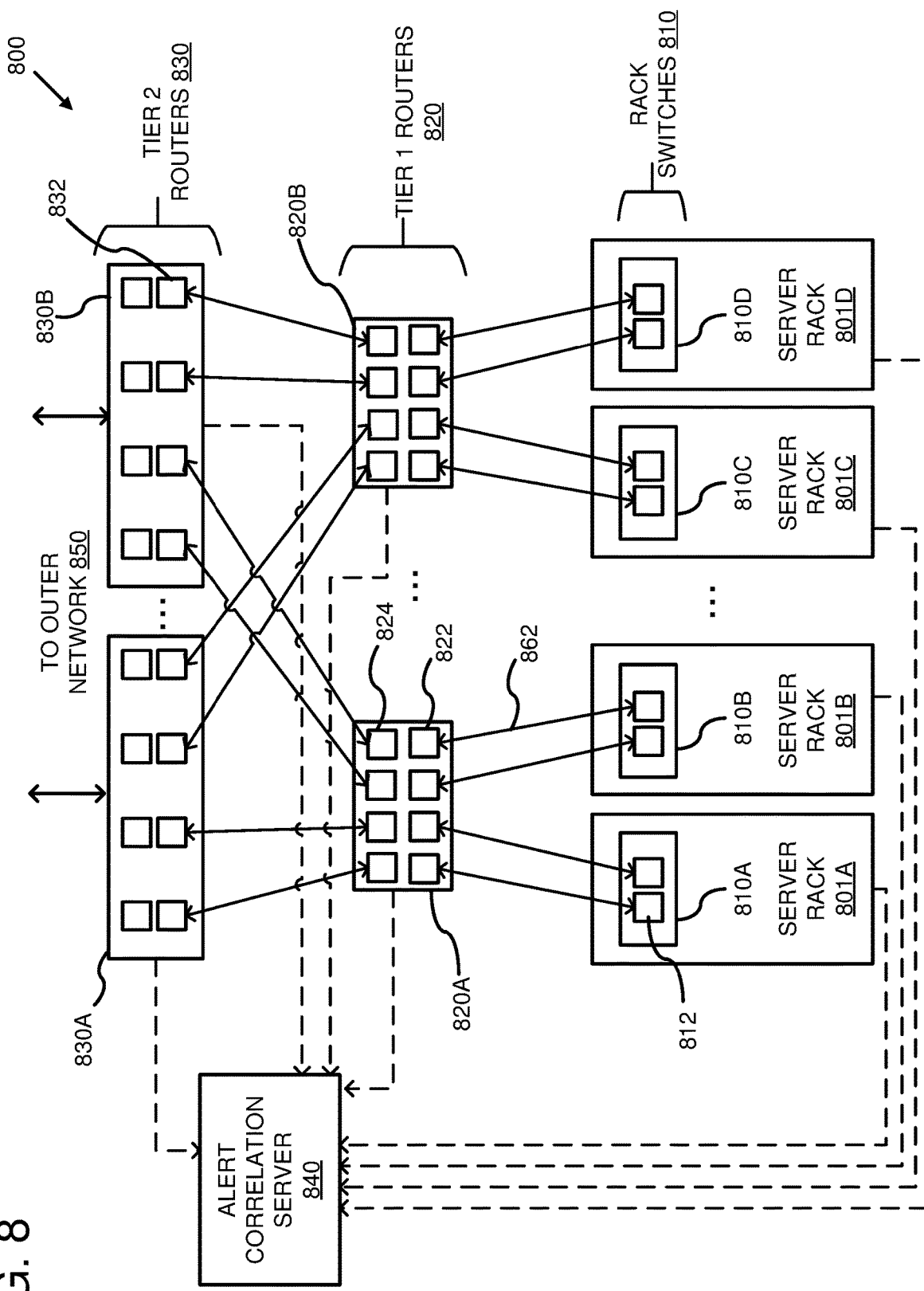
FIG. 8 is a system diagram depicting an example system comprising an alert correlation server connected to a plurality of networked nodes in an example network.

FIG. 8 is a system diagram depicting an example system 800 comprising an alert correlation server 840 configured to receive alert messages from a plurality of network components in an example network. The example network components can be associated with received alert messages and used to correlate the alerts as described herein.

In example system 800, a plurality of server racks 801A-D comprise rack switches 810A-D, respectively. The rack switches comprise multiple ports (or network interfaces) 812. The ports 812 of the rack switches 810A-B are connected to various ports 822 of tier 1 routers 820A-B. The rack switches 810A-D are configured to transfer network communications between the tier 1 routers 820A-B and servers (not illustrated) residing in server racks 801A-D. Rack switches 810A-D are configured to use ports 812 to transmit data to and receive data from the tier 1 routers 820A-B. The tier 1 routers 820A-B, in turn, are configured to receive the data via the ports 822. Tier 1 routers 820A-B are connected to tier 2 routers 830A-B and are configured to transmit data received from the rack switches 810A-D to the tier 2 routers 830A-B via ports 824 connected to ports 832 of the tier 2 routers 830A-B. The tier 2 routers 830, in turn, are configured to receive data from the tier 1 routers 820 using ports 832, to transmit received data out to an outer network 850, and to transmit data received from network 850 to the tier 1 routers 820 using ports 832.

An alert correlation server 840 can be configured to receive alert messages from the rack switches 810, the tier 1 routers 820, and the tier 2 routers 830. The alert messages can pertain to network errors encountered with respect to attempted communications with other components in the network (such as other switches or routers, and/or ports of other switches or routers). The alert correlation server 840 can be configured to perform alert correlation operations using the received alert messages as described herein.

In at least some embodiments, the alert correlation server 840 can be configured to use a model of the network components to correlate the network alerts. For example, assume that the alert correlation server 840 receives an alert message from the rack switch 810A, indicating that a port 812 of the rack switch 810A has failed, and another alert message from the tier 1 router 820A, indicating that a port 822 of the tier 1 router 820A has failed. The alert correlation server can use the model of the network to determine that the ports identified in the alert messages are connected and can correlate the alerts to conclude that a communication link connecting the identified ports has failed.

Although FIG. 8 depicts four rack switches, two tier 1 routers, and two tier 2 routers, other numbers of rack switches and routers are also possible. Two ports 812 are depicted in FIG. 8 for each of the server rack switches 810A-D; however, it is possible for the server rack switches to contain other numbers of ports 812. It is also possible for the server rack switches to have varying numbers of ports. Similarly, although eight ports 832 are depicted for the tier two routers 830, other numbers of ports 832 are possible. Likewise, other numbers of tier 1 router ports 822 and 824 than those depicted are possible as well.

In any of the examples described herein, the term "uplink port" refers to a device's port that is connected to another device at a higher layer in a network topology. For instance, in FIG. 8, ports 812 can be characterized as "uplink ports" because they are connected to devices at higher layers in a network topology (i.e., tier 1 routers 820A-B). Similarly, ports 824 can also be characterized as "uplink ports" because they are connected to tier 2 routers 830A-B, which are higher in the network topology than the tier 2 routers 820A-B.

In any of the examples described herein, the term "downlink port" refers to a device's port connected to another device at a lower layer in a network topology. For instance, in FIG. 8, ports 832 can be characterized as "downlink ports" because they are connected to devices at a lower layer in the network topology (i.e., tier 2 routers 820A-B). Similarly, ports 822 of the tier 2 routers 820A-B can be characterized as "downlink ports" because they are connected to devices at a lower layer in the network topology (i.e. rack switches 810A-D).

Figure 9:
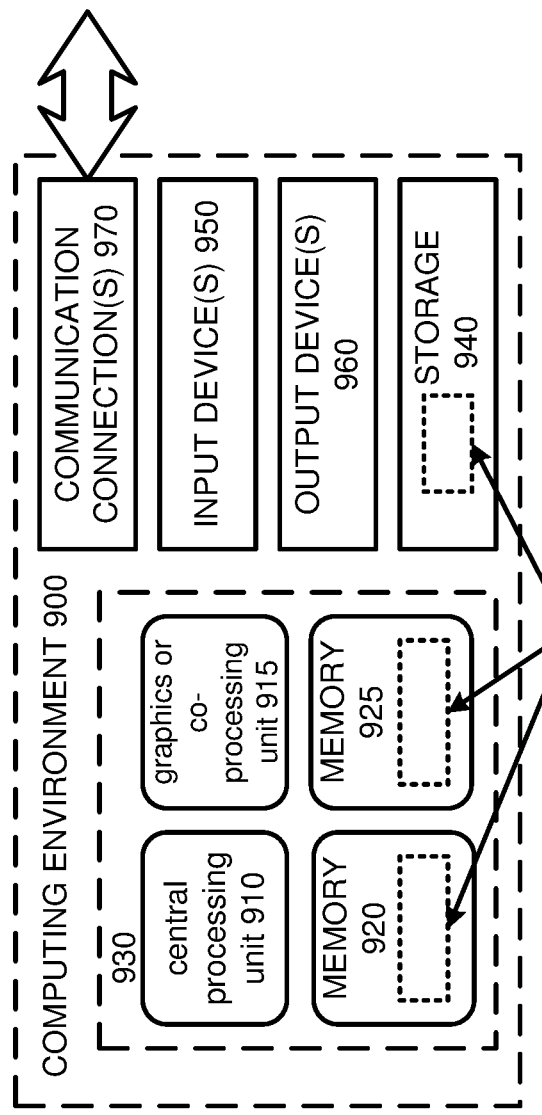
FIG. 9 depicts a generalized example of a suitable computing environment in which the described innovations may be implemented.

FIG. 9 depicts a generalized example of a suitable computing environment 900 in which the described innovations may be implemented. The computing environment 900 is not intended to suggest any limitation as to scope of use or functionality, as the innovations may be implemented in diverse general-purpose or special-purpose computing systems. For example, the computing environment 900 can be any of a variety of computing devices (e.g., desktop computer, laptop computer, server computer, tablet computer, etc.).

With reference to FIG. 9, the computing environment 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, etc.), or some combination of the two, accessible by the processing unit(s). The memory 920, 925 stores software 980 implementing one or more innovations described herein, in the form of computer-executable instructions suitable for execution by the processing unit(s).

In at least some embodiments, the computing environment 900 can be a computing device or server as described herein.

A computing system may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The tangible storage 940 may be removable or non-removable, and includes magnetic disks, magnetic tapes or cassettes, CD-ROMs, DVDs, or any other medium which can be used to store information in a non-transitory way and which can be accessed within the computing environment 900. The storage 940 stores instructions for the software 980 implementing one or more innovations described herein.

The input device(s) 950 may be a touch input device such as a keyboard, mouse, pen, or trackball, a voice input device, a scanning device, or another device that provides input to the computing environment 900. The output device(s) 960 may be a display, printer, speaker, CD-writer, or another device that provides output from the computing environment 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. In at least some embodiments, one or more of the communication connections 970 can comprise interfaces (such as network communication interfaces) as described herein.

In some embodiments, the storage 940, input devices(s) 950, output device(s) 960, communication connection(s) 970, and/or the graphics or co-processing unit 915 comprise one or more of the example electronic devices as described herein.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), a data center, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), microprocessors, etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system for correlating network alerts using a placeholder correlation record, wherein the system comprises:
    a server connected to a computer network, wherein the server comprises a processor and a computer-readable medium storing instructions that, when executed by the processor, configure the server to perform operations, the operations comprising:
    receiving a first network alert message associated with a first network component;
        creating a first alert correlation record associated with the first network alert message and storing the first alert correlation record in a correlation record data store;
        using a model of the computer network, identifying a second network component related to the first network component;
        creating a placeholder correlation record associated with the second network component and storing the placeholder correlation record in the correlation record data store;
        generating a network event message, wherein the generating comprises associating the first alert correlation record and the placeholder correlation record with the network event message;
    receiving a second network alert message;
    creating a second alert correlation record associated with the second network alert message;
    determining that a third network component is associated with the second alert correlation record;
    determining that the second alert correlation record is related to the placeholder correlation record by determining that the third network component is related to the second network component in the model of the computer network; and
    associating the second alert correlation record with the network event message using the placeholder correlation record, wherein the network event message indicates that the second network component has encountered an error.

2. The system of claim 1, wherein:
    the second network component is a computing device;
    the first and third network components are network interfaces of the computing device;
    the model of the computer network comprises a tree data structure in which the computing device is associated with a tree node and the network interfaces are associated with child nodes of the tree node; and
    the network event message indicates that the computing device is unreachable via the computer network.

3. The system of claim 1, wherein:
    the first and third network components are network interfaces of separate computing devices;
    the second network component is a communication link connecting the network interfaces;
    the model of the computer network comprises a graph structure in which the network interfaces are associated with graph nodes and the communication link is associated with an edge connecting the graph nodes; and
    the network event indicates that the communication link has failed.

4. The system of claim 1, wherein:
    the first alert correlation record and the placeholder correlation record are created by a first process; and
    the second alert correlation record and the network event message are created by a second process.

5. The system of claim 1, wherein:
    the placeholder correlation record specifies a cooldown time range; and
    the determining that the placeholder correlation record is related to the second alert correlation record comprises determining that a current time value is within the specified cooldown time range of the placeholder correlation record.

6. A method, comprising:
    receiving an alert message via a computer network;
    generating an alert correlation record based on contents of the alert message;
    creating a placeholder correlation record in association with the alert correlation record and in association with a network entity;
    generating a network event message, wherein the generating comprises associating the alert correlation record and the placeholder correlation record with the network event message;
    receiving another alert message via the computer network;
    generating another alert correlation record based on contents of the another alert message;
    determining that another network entity is associated with the another alert correlation record;
    determining that the another network entity is related to the network entity;
    determining that the placeholder correlation record is associated with the network entity; and
    associating the another alert correlation record with the network event message using the placeholder correlation record, wherein the network event message indicates that the network entity encountered an error that affected the another network entity.

7. The method of claim 6, further comprising:
    determining that the another network entity is related to the network entity using a model of the computer network.

8. The method of claim 7, wherein:
    the model of the computer network comprises a hierarchical representation of network entities in the computer network; and the method further comprises determining that the another network entity is in a hierarchical relationship with the network entity in the hierarchical representation of the computer network.

9. The method of claim 8, wherein:
the network entity is a network interface;
the another network entity is a computing device comprising the network interface; and
the network event message further indicates that the computing device is unreachable.

10. The method of claim 8, wherein:
the network entity is a computing device;
the another network entity is a data center comprising the computing device; and
the network event message further indicates that multiple computing devices in the data center are unreachable.

11. The method of claim 7, wherein:
the model of the computer network comprises a graphical representation of network entities in the computer network, wherein the network entity is associated with a node in the graphical representation; and
the method further comprises determining that the another network entity is associated with an edge in the graphical representation that is connected to the node associated with the network entity.

12. The method of claim 11, wherein:
the network entity is a network interface;
the another network entity is a communication link connected to the network interface and another network interface; and
the network event message further indicates that the communication link has encountered an error.

13. The method of claim 6, further comprising:
searching a correlation table in a database for the placeholder correlation record.

14. The method of claim 6, wherein the generated alert correlation record indicates that the network event message is associated with the received alert message.

15. The method of claim 6, further comprising:
identifying another alert correlation record that is associated with the placeholder correlation record;
identifying another alert message associated with the another alert correlation record; and
wherein the generated alert correlation record indicates that the network event message is associated with the another alert message.

16. A system, comprising:
a computing device connected to a computer network, wherein the computing device is configured to:
receive an alert message via the computer network, wherein the alert message comprises an identifier for a first network component;
generate an alert correlation record based on the identifier for the first network component;
create a placeholder correlation record in association with the alert correlation record and in association with the first network component;
generate a network event message, wherein the generating comprises associating the alert correlation record and the placeholder correlation record with the network event message;
receive another alert message via the computer network;
generate another alert correlation record based on contents of the another alert message;
determine that a second network component is associated with the another alert correlation record;
determine that the second network component is related to the first network component;
determine that the placeholder correlation record is associated with the first network component; and
associate the another alert correlation record with the network event message using the placeholder correlation record, wherein the network event message indicates that the first network component encountered an error that affected the second network component.

17. The system of claim 16, wherein:
the placeholder correlation record comprises:
an identifier for the first network component; and
a reference to the alert correlation record.

18. The system of claim 16, wherein:
the second network component is another computing device;
the first network component is a network interface of the another computing device; and
the network event message further indicates that the another computing device is unreachable via the network.

* * * * *